United States Patent

Arai

[11] Patent Number: 5,445,773
[45] Date of Patent: Aug. 29, 1995

[54] METHOD FOR DETECTING ABNORMALITY IN HYDRAULIC SYSTEM OF MOLDING MACHINE AND APPARATUS THEREFOR

[75] Inventor: Tsuyoshi Arai, Hanishina, Japan

[73] Assignee: Nissei Plastic Industrial Co., Ltd., Nagano, Japan

[21] Appl. No.: 297,908

[22] Filed: Aug. 18, 1994

[30] Foreign Application Priority Data

Sep. 8, 1993 [JP] Japan .................. 5-223522

[51] Int. Cl.6 .................. B29C 45/82; B29C 33/24
[52] U.S. Cl. .................. 264/40.1; 425/136; 425/151; 425/167; 425/169
[58] Field of Search .................. 264/40.1, 40.5, 328.1, 264/39; 425/135, 136, 149, 151, 167, 168, 169, 170

[56] References Cited

U.S. PATENT DOCUMENTS 4,252,174  2/1981  Miki et al. .................. 425/154
5,007,817  4/1991  Wallis .................. 425/136

Primary Examiner—Jill L. Heitbrink
Attorney, Agent, or Firm—Oliff & Berridge

[57] ABSTRACT

A method for detecting an abnormality of a hydraulic system in a molding machine which comprises a hydraulic cylinder for reciprocating a movable member of the molding machine, a valve for controlling a hydraulic fluid which is supplied into the hydraulic cylinder, and a pair of pressure sensors attached to the hydraulic cylinder, for detecting the pressures in a pair of pressure chambers of the hydraulic cylinder, is disclosed. The method comprises the steps of: holding the valve at a neutral position, and comparing the pressures in the pair of pressure chambers with a preset range of pressure on the basis of detecting signals from the pair of pressure sensors, when the movable member is inoperative; and outputting an abnormality signal when at least one of the pressures in the pair of pressure chambers is out of the preset range of pressure.

10 Claims, 3 Drawing Sheets

METHOD FOR DETECTING ABNORMALITY IN HYDRAULIC SYSTEM OF MOLDING MACHINE AND APPARATUS THEREFOR

BACKGROUND OF THE INVENTION

1. Field of the Invention

The present invention relates to a method for detecting an abnormality in a hydraulic system of a molding machine and an apparatus therefor. In particular, the present invention relates to a method which is suitable for detecting an abnormality in a hydraulic system which is used for transferring an injection screw of an injection molding machine or for transferring a movable platen having a movable mold mounted thereon, and relates to an apparatus therefor.

2. Description of Related Art

Conventionally, for example, a hydraulic system having a hydraulic cylinder is used as a driving member for reciprocating a movable member, e.g., an injection screw in an injection molding machine, a movable platen having a movable mold thereon or the like.

A hydraulic system having a structure shown in FIG. 4, which is applied for the injection screw of the injection molding machine, is generally known.

Hereinafter, the injection molding machine 1 and the hydraulic system thereof will be explained as follows. The injection molding machine 1 comprises an injection screw 2, a heating tube 3, a hydraulic cylinder 4 of a double rod type for rotating and reciprocating the injection screw 2, a servo valve 7 for supplying a hydraulic fluid into a pair of pressure chambers 5 and 6 which are formed in the hydraulic cylinder 4, pressure sensors 8 and 9 for detecting the pressures in the pair of pressure chambers 5 and 6, and a servo control member 12 for controlling the operation of the servo valve 7. The injection screw 2 is rotatably provided and reciprocated in the heating tube 3. The hydraulic cylinder 4 is connected with the rear end of the injection screw 2. The pressure sensors 8 and 9 are attached to the hydraulic cylinder. The servo control member 12 previously sets a target value of the transfer velocity of the injection screw 2 and a target value of the injection pressure thereof, to be controlled, and controls the operation of the servo valve 7 on the basis of detecting signals from the pair of pressure sensors 8 and 9, and on the basis of a position detecting signal for the hydraulic cylinder 4 from a position sensor 11 which is provided on a injection ram 10 of the hydraulic cylinder 4. The hydraulic system comprises the hydraulic cylinder 4, the servo valve 7, the pair of pressure sensors 8 and 9, and the servo control member 12.

[0004]

The servo control member 12 comprises a servo sequential control unit 13, a velocity conversion unit 14, a velocity operation unit 15, a comparator 19, a pressure operation unit 20, and a servo amplifier 21. The servo sequential control unit 13 previously sets target values of an injection velocity, an injection pressure and the like which constitute injection conditions. The velocity conversion unit 14 calculates the current transfer velocity of the injection screw 2 on the basis of the detecting signal from the position sensor 11. The velocity operation unit 15 compares a signal from the velocity conversion unit 14 which is a feedback signal of the velocity, with the velocity signal having the preset target value which is outputted from the servo sequential control unit 13, and outputs a velocity correction signal on the basis of the comparison result thereof. The detecting signals from the pair of pressure sensors 8 and 9 are applied to the comparator 19 through differential amplifiers 17 and 18. The pressure operation unit 20 compares a signal outputted from the comparator 19 which is a feedback signal of the injection pressure, with a pressure signal having the preset target value which is outputted from the servo sequential control unit 13, and outputs a pressure correction signal on the basis of the result thereof. The servo amplifier 21 which is selectively connected with the pressure operation unit 20 and the velocity operation unit 15, amplifies each of the correction signals from these units and outputs the amplified signal thereof to the servo valve 7 as a driving signal therefor.

The servo valve 7 is connected with a pressure source 22 for supplying the hydraulic fluid to the servo valve 7 and with a drain tank 23 for receiving hydraulic fluid drained from the hydraulic cylinder 4.

In such a conventional hydraulic system, if an injection were carried out in situations where an abnormality occurs in the hydraulic system, there is a possibility of faulty operation of the injection molding machine 1, so that there is a certain danger of destruction of the injection molding machine 1, a mold or the like. The abnormality occurs in the hydraulic system, for example, when either of the pair of pressure sensors 8 and 9 is damaged, when no pressure can be applied to the pressure sensors 8 and 9, or when trouble occurs in the operation of the servo valve 7, for some reason.

Generally, almost the above-mentioned abnormality has been detected after an injection is commenced. It is necessary to detect an abnormality condition before the starting of an injection.

SUMMARY OF THE INVENTION

The present invention was developed in view of the abovedescribed conventional problems. An object of the present invention is to provide a method for detecting an abnormality of a hydraulic system in a molding machine, in which an abnormality in the pressure sensor, in the valve or the like can be detected before the operation starting of a movable member, and to provide an apparatus therefor.

In accordance with one aspect of the present invention, the method for detecting an abnormality of a hydraulic system in a molding machine which comprises a hydraulic cylinder for reciprocating a movable member of the molding machine, a valve for controlling a hydraulic fluid which is supplied into the hydraulic cylinder, and a pair of pressure sensors which are provided on the hydraulic cylinder, for detecting the pressures in a pair of pressure chambers of the hydraulic cylinder; comprises the steps of: holding the valve at a neutral position; judging whether each of the pressures in the pair of pressure chambers is in a preset range of pressure on the basis of detecting signals from the pair of pressure sensors, when the movable member is inoperative; and outputting an abnormality signal when at least one of the pressures in the pair of pressure chambers is out of the preset range of pressure.

According to the method for detecting an abnormality of the hydraulic system in the molding machine of the present invention, when a hydraulic fluid is supplied into the valve which is held at the neutral position while the movable member of the molding machine is inoperative, the hydraulic fluid is supplied into both the hydraulic chambers of the hydraulic cylinder through the valve, so that the internal pressures of the hydraulic chambers rise.

For example, when one of the pressure sensors is damaged, or when no pressure can be applied to the pressure sensor, the signal outputted from the pressure sensor is zero. Since the outputted signal is less than the lower limit value of the preset pressure range, the condition of the hydraulic system is judged to be abnormal, and thus an abnormality signal is outputted.

Therefore, an abnormality in the pressure sensor or in the vicinity of the pressure detecting part can be detected before the operation starting of a movable member.

Preferably, the judgement whether each of the pressures in the pair of pressure chambers is in the preset range is carried out after the lapse of a predetermined time from supply of the hydraulic fluid into the valve.

Accordingly, the pressure of the hydraulic fluid supplied into both the hydraulic chambers through the valve rises to a standard pressure, after the lapse of a predetermined time from supply of the hydraulic fluid into the valve, in a normal condition. It is possible to clarify the difference between the normal condition and an abnormal condition by the judgement whether each of the pressures in the pair of pressure chambers is in the preset range of pressure. Thus, an abnormal condition can be accurately detected.

In accordance with another aspect of the present invention, the method for detecting an abnormality of a hydraulic system in a molding machine which comprises a hydraulic cylinder for reciprocating a movable member of the molding machine, a valve for controlling a hydraulic fluid which is supplied into the hydraulic cylinder, and a pair of pressure sensors which are provided on the hydraulic cylinder, for detecting the pressures in a pair of pressure chambers of the hydraulic cylinder; comprises the steps of: comparing the pressures in the pair of pressure chambers on the basis of detecting signals from the pair of pressure sensors, when the movable member is inoperative; and outputting an abnormality signal when the pressures in the pair of pressure chambers are substantially out of balance.

In such a method for detecting an abnormality of the hydraulic system in the molding machine, the valve is held at the neutral position, and the pressures of the hydraulic fluid supplied into both the hydraulic chambers become in balance, while the movable member of the molding machine is inoperative. The pressures in both the hydraulic chambers are compared to each other. Consequently, when these pressures are in balance, it is judged that the valve or a passage for supplying the hydraulic fluid is in a normal condition. On the contrary, when these pressures are out of balance, it is judged that the valve or the passage for supplying is in an abnormal condition.

In accordance with another aspect of the present invention, the apparatus for detecting an abnormality of a hydraulic system in a molding machine comprises: a hydraulic system which comprises a hydraulic cylinder for reciprocating a movable member of the molding machine, a valve for controlling a hydraulic fluid which is supplied into said hydraulic cylinder, and a pair of pressure sensors provided on said hydraulic cylinder, for detecting the pressures in a pair of pressure chambers of said hydraulic cylinder; a controlling member for controlling the operation of the valve; and a pressure monitoring member for outputting an abnormality signal when the pressures in the pair of pressure chambers are out of balance or when at least one of the pressures in the pair of pressure chambers is out of a preset range of pressure, by comparing the pressures in the pair of pressure chambers or by judging whether each of the pressures in the pair of pressure chambers is in the preset range of pressure, on the basis of detecting signals from the pair of pressure sensors.

In such an apparatus for detecting an abnormality of the hydraulic system in the molding machine, general operation of the movable member is controlled by controlling the operation of the valve on the basis of the preset pressure in a control member.

A comparison between the pressures in the pair of pressure chambers of the hydraulic cylinder or a judgement whether each of the pressures in the pair of pressure chambers is in the preset range of pressure is carried out by inputting detecting signals from the pair of pressure sensors into the pressure monitoring member. An abnormality signal is outputted from the pressure monitoring member when the pressures in the pair of pressure chambers are out of balance or when the pressure in one of the pressure chambers is out of the preset range of pressure.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Hereinafter, an embodiment of the present invention will be explained with reference to FIGS. 1-3.

First, prior to an explanation of the method for detecting an abnormality according to the present invention, an embodiment of the apparatus for detecting an abnormality, which is for suitably carrying out the method of the present invention, will be explained.

Figure 4:
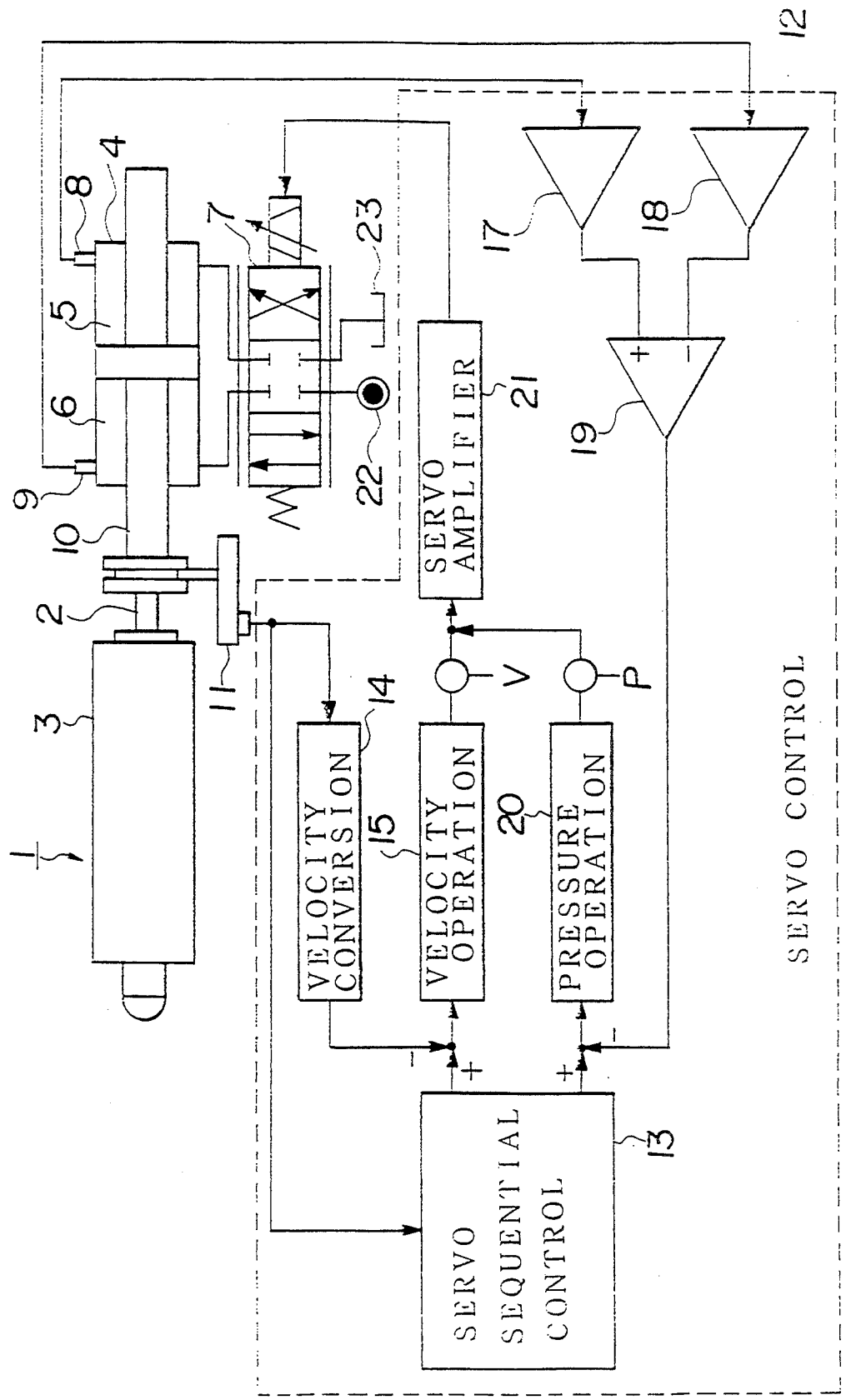
FIG. 4 is a block diagram of a molding machine including a conventional control circuit.

In the following explanation, an embodiment in which a pressure signal of a hydraulic cylinder detected by pressure sensors is used as a feedback signal for controlling a movable member, is illustrated. In order to simplify the explanation, the same numerals are given to the parts which have the same construction as that of the conventional molding machine shown in FIG. 4.

The molding machine 30 comprises an injection screw 2; a heating tube 3 in which the injection screw 2 is provided; a hydraulic cylinder 4 of a double rod type for operating the injection screw 2; a servo valve 7 for supplying a hydraulic fluid into a pair of pressure chambers 5 and 6 which are formed in the hydraulic cylinder 4; pressure sensors 8 and 9 for detecting the pressures in the pair of pressure chambers 5 and 6; and a servo control member 31 for controlling the operation of the servo valve 7. The hydraulic system is composed of the hydraulic cylinder 4, the servo valve 7, the pair of pressure sensors 8 and 9, and the servo control member 31.

The servo control member 31 comprises a servo sequential control unit 13; a velocity conversion unit 14; a velocity operation unit 15 for outputting a velocity correction signal; a comparator 19 to which detecting signals from the pair of pressure sensors 8 and 9 are outputted through differential amplifiers 17 and 18; a pressure operation unit 20 for outputting a pressure correction signal; and a servo amplifier 21 which is selectively connected with the pressure operation unit 20 and the velocity operation unit 15, and which amplifies each of the correction signals from these units and outputs the amplified signal to the servo valve 7 as a driving signal therefor; similarly to the above-mentioned conventional servo control member 12.

The servo control member 31 further comprises a pressure monitoring unit 32 into which signals with respect to pressures in the pair of pressure chambers 5 and 6 are separately inputted through the differential amplifiers 17 and 18.

The servo control member 31 includes a mechanical control unit 33 for controlling the operation of mechanical parts of the molding machine 30.

In the pressure monitoring unit 32 in this embodiment, a range of pressure which is used as a standard for detecting an abnormality of the hydraulic system is previously stored.

Figure 3:
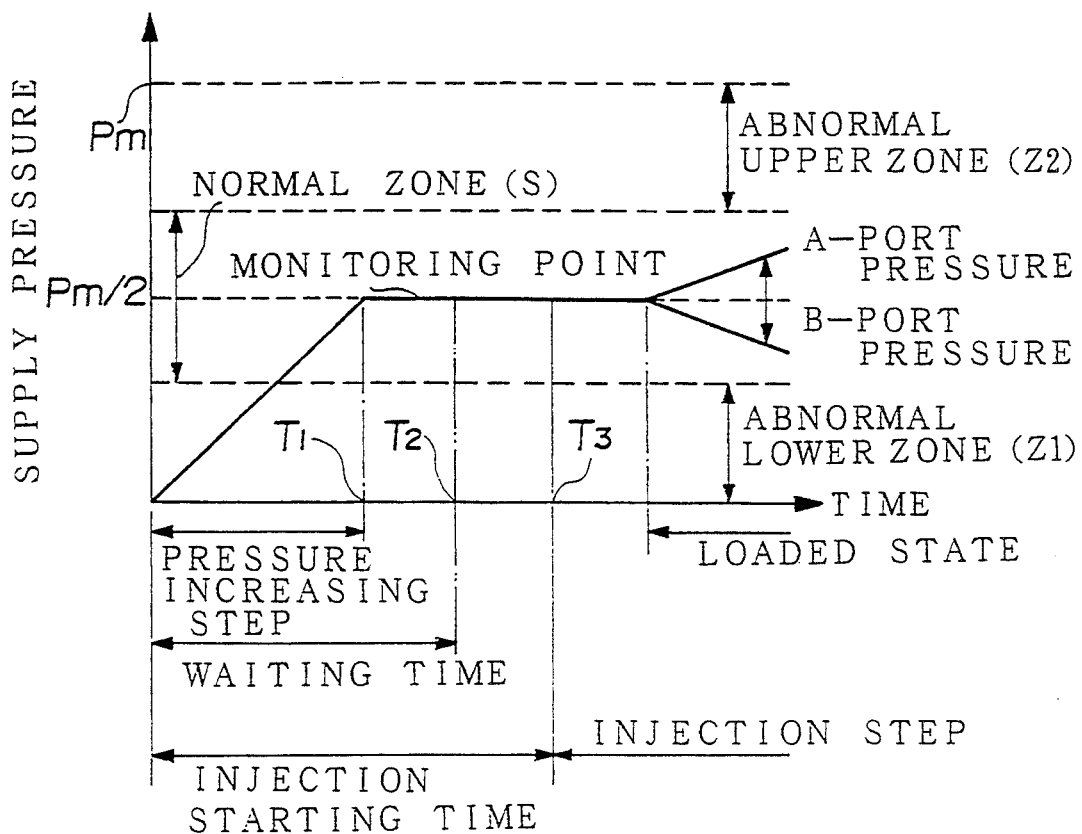
FIG. 3 is a curve of the pressure change for explaining the function of the present invention.

The range of pressure which is shown by the normal zone S in FIG. 3, has a predetermined vertical width which is centered at a standard value being half of the pressure Pm of the hydraulic fluid generated at a pressure source 22. The predetermined width of the range of the pressure is determined according to the type of the molding machine and the magnitude of the pressure generated at the pressure source 22.

Figure 2:
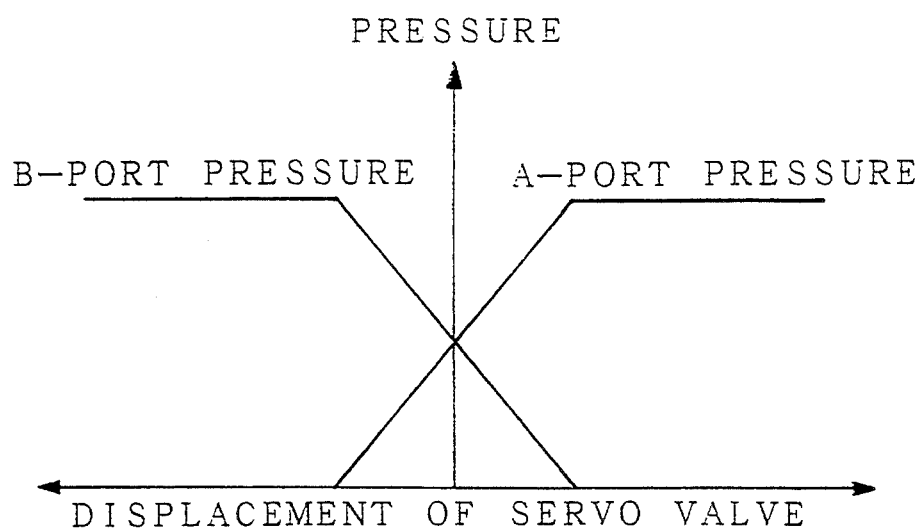
FIG. 2 is a characteristic curve of pressures in a servo valve which is used in an embodiment of the present invention.

The changes of pressures at the A and B ports in the output side of the servo valve 7 are shown in FIG. 2.

In this Figure, the displacement of the servo valve 7, i.e., the main valve, is entered the horizontal axis of the graph and the pressure of the ports is entered the vertical axis. When the displacement of the servo valve 7 is zero, that is, when the servo valve 7 is at the neutral position, the pressures of both the ports are the same. The magnitude of the pressure is approximately half of the pressure Pm of the hydraulic fluid supplied from the pressure source 22.

When the position of the servo valve 7 varies in one direction from the neutral position, the pressure of one of the ports A and B is increased and the pressure of the other is decreased.

The operation of the molding machine 30 having such a construction and an embodiment of the method for detecting an abnormality of the hydraulic system of the present invention will be explained as follows.

In the molding machine 30, when the hydraulic fluid is supplied from the pressure source 22 into the servo valve 7, the pressure of the hydraulic fluid supplied into the hydraulic cylinder 4 from both ports A and B of the servo valve 7 is linearly increased. After the lapse of a time T1 which is denoted as a pressure increasing step in FIG. 3, the pressure of the hydraulic fluid reaches approximately half of the pressure Pm of the hydraulic fluid generated at the pressure source 22, and then becomes in balance.

In this state, the pressures in the pair of pressure chambers 5 and 6 of the hydraulic cylinder 4 which are communicated with both the ports A and B are also increased. These pressures are detected by the pair of pressure sensors 8 and 9. The injection pressure is calculated by the comparator 19 and fed back to the pressure operation unit 20.

Figure 1:
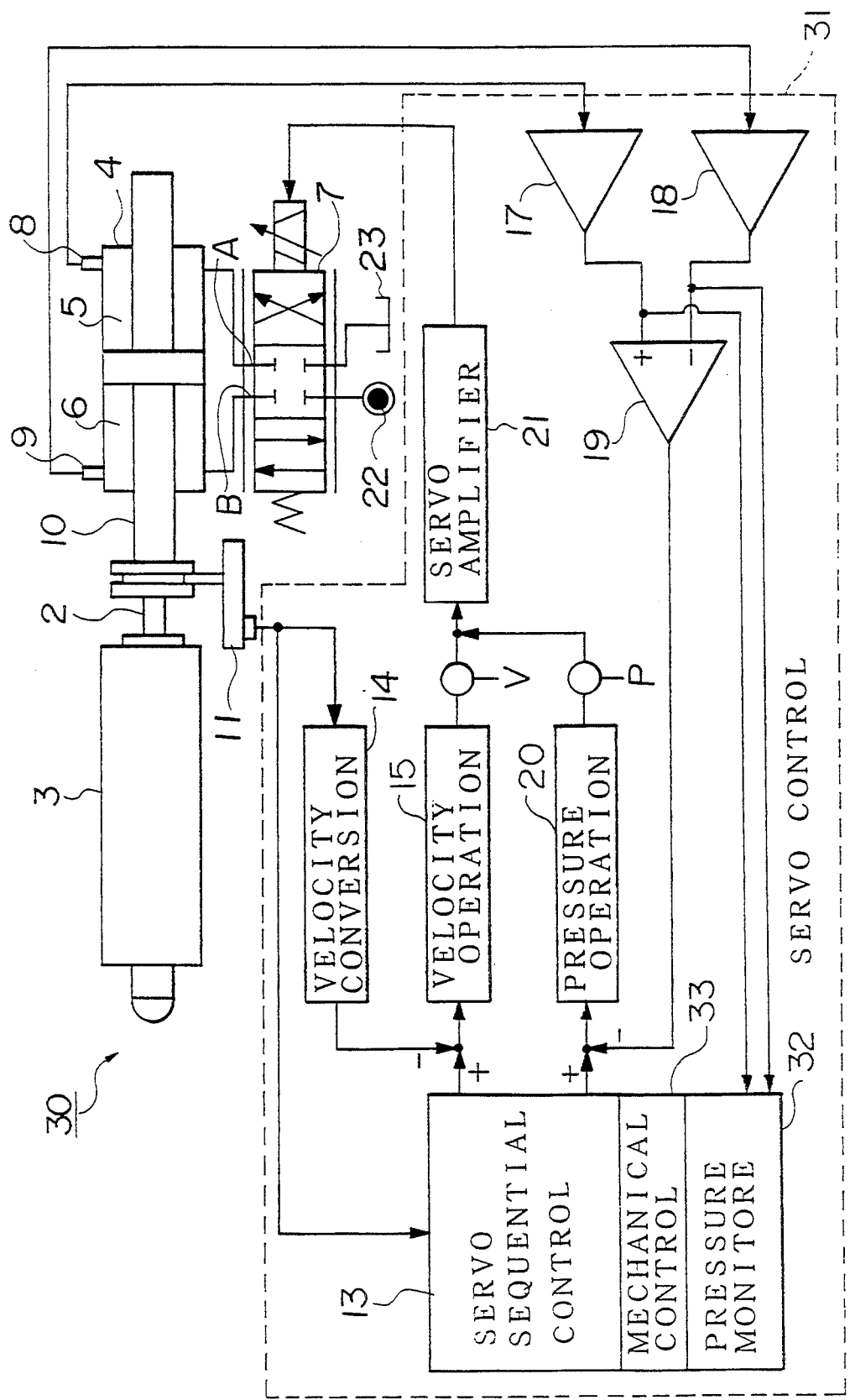
FIG. 1 is a block diagram of a molding machine including a control circuit, which uses an embodiment of the present invention.

Pressure information of each of the pressure chambers 5 and 6 is separately inputted into the pressure monitoring unit 32 and monitored separately, as shown in FIG. 1, as well as such a feedback to the pressure operation unit 20.

After the pressure of the hydraulic fluid supplied into the hydraulic cylinder has been held for a predetermined time which is denoted by T3 in FIG. 3, an injection step is started. The injection step is started by a forward movement of the injection ram 10 and of the injection screw 2. The forward movement is generated by the difference between the pressures of the hydraulic fluid supplied from the ports A and B. In the injection step, when the position of the servo valve 7 varies in one direction from the neutral position, the pressure of the hydraulic fluid supplied from the port A is increased and the pressure of the hydraulic fluid supplied from the port B is decreased.

In the pressure monitoring unit 32, at a predetermined time T2 which is between the end of the pressure increasing step T1 and the injection starting time T3, it is judged whether each of the pressures detected by the pair of pressure sensors 8 and 9 is in the preset range of pressure which is denoted as the normal zone S in the embodiment. When it is judged that each of these pressures is in the normal zone S, as shown in FIG. 3, it is decided that the hydraulic system in the molding machine is in a normal condition, and then the subsequent injection step is started.

On the other hand, when it is judged that at least one of the values detected by the pair of pressure sensors 8 and 9 is out of the normal zone S, i.e., in an abnormal upper zone Z2 or in an abnormal lower zone Z1, it is decided that the hydraulic system is in an abnormal condition. Consequently, the shift toward the subsequent injection step is stopped, and a warning, e.g., turning on-and-off of a warning light, making a warning sound or the like, is carried out.

It is considered that the cause of occurrence of such an abnormal condition may be damage, malfunction, or disconnection of the pressure sensors 8 and 9, damage of the pressure detecting part in the hydraulic cylinder 4, damage of the servo valve 7 itself or of a supply system of the hydraulic fluid, and the like.

Therefore, according to this embodiment, it is possible to detect the presence or absence of an abnormality in the hydraulic system prior to the injection starting by the injection screw 2, and to stop the shift toward the subsequent injection step when an abnormality is detected. Therefore, it is possible to eliminate the possibility of faulty operation of the injection molding machine 30 and to prevent damage of other construction members.

In this embodiment, detection of the abnormal condition is carried out after the lapse of a time T2 from the supply starting of the hydraulic fluid. In a normal condition, the above-described comparison or judgement is carried out after the pressure of the hydraulic fluid becomes stable. Therefore, it is possible to clarify the difference between a normal condition and an abnormal condition. Thus, an abnormal condition can be accurately detected.

Next, another embodiment of the method for detecting an abnormality of the hydraulic system according to the invention will be explained as follows.

The method for detecting an abnormality according to this embodiment is, in particular, for detecting an abnormality of the servo valve 7. In this method, the pressures in the pair of pressure chambers 5 and 6 of the hydraulic cylinder 4 are detected when the hydraulic fluid is supplied into the hydraulic cylinder 4 through the servo valve 7 from the pressure source 22, while the movable member is inoperative. When there are certain differences between the pressures in the pair of pressure chambers 5 and 6, an abnormality signal is outputted.

When the the servo valve 7 is in a normal condition, the servo valve 7 is held at the neutral position to supply the hydraulic fluid into the pair of pressure chambers 5 and 6 of the hydraulic cylinder 4 so that the pressures in the pressure chambers 5 and 6 are the same, while the injection screw 2 is inoperative. It is judged that when there are certain differences between the pressures in the pair of pressure chambers 5 and 6, in spite of the injection screw 2 being inoperative, the supply of the hydraulic fluid is not normally carried out, that is, an abnormality exists in the servo valve 7.

It should also be understood that the foregoing relates to only preferred embodiments of the invention, and that various changes and modifications may be made according to the kind of the applied molding machine, a demand on design or the like.

For example, only a hydraulic system for a driving system for the injection screw is illustrated in each of the abovedescribed embodiments. However, in place of the system, it is possible to apply the present invention to a hydraulic system for a driving system for a moving platen.

Furthermore, the present invention may be applied not only for an injection molding machine but also for another type of molding machine. An example of an injection molding machine in which a feedback control on the basis of pressure signals from the pressure sensors is carried out is illustrated in the above-described embodiments. However, it is possible to apply the present invention to a molding machine in which an open control is carried out.

As described above, in the method for detecting an abnormality of the hydraulic system in the molding machine of the present invention, the valve into which a hydraulic fluid is supplied is held at the neutral position, and an abnormality signal is outputted when at least one of the pressures of the pair of pressure chambers of the hydraulic cylinder is out of a preset range of pressure. Therefore, it is possible to detect the presence or absence of an abnormality in the hydraulic system prior to the injection start, and not to start the operation of the movable member. Therefore, it is possible to eliminate the possibility of faulty operation of the injection molding machine and to prevent damage of other construction members.

In the method for detecting an abnormality of the hydraulic system in the molding machine according to another aspect of the present invention, the presence or absence of a difference between the pressures in the pair of pressure chambers of the hydraulic cylinder is detected, while the movable member is inoperative. When the pressures in the pressure chambers are out of balance, it is judged to be in an abnormal condition. Thereby, it is possible to check the function of the valve for supplying the hydraulic fluid into the hydraulic cylinder.

The check of the function can be carried out before the operation start of the movable member. Therefore, it is possible to eliminate the possibility of faulty operation of the injection molding machine and thereby to prevent damage of construction members.

The apparatus for detecting an abnormality of the hydraulic system in the molding machine of the present invention enables preferred practices of the above-described the methods for detecting an abnormality.

What is claimed is:

1. A method for detecting an abnormality of a hydraulic system in a molding machine which comprises a hydraulic cylinder for reciprocating a movable member of the molding machine, a valve for controlling a hydraulic fluid which is supplied into the hydraulic cylinder, and a pair of pressure sensors which are provided on the hydraulic cylinder, for detecting the pressures in a pair of pressure chambers of the hydraulic cylinder; comprising the steps of:

holding the valve at a neutral position;

judging whether each of the pressures in said pair of pressure chambers is in a preset range of pressure on the basis of detecting signals from said pair of pressure sensors, when said movable member is inoperative; and outputting an abnormality signal when at least one of the pressures in said pair of pressure chambers is out of said preset range of pressure.

2. A method for detecting an abnormality of a hydraulic system as claimed in claim 1; wherein the judgement whether each of the pressures in said pair of pressure chambers is in said preset range is carried out after the lapse of a predetermined time from supply of the hydraulic fluid into said valve.

3. A method for detecting an abnormality of a hydraulic system as claimed in claim 1; wherein said method is for detecting an abnormality of a hydraulic system in an injection molding machine.

4. A method for detecting an abnormality of a hydraulic system as claimed in claim 1; wherein said hydraulic system is for a driving system for an injection screw of said molding machine.

5. A method for detecting an abnormality of a hydraulic system as claimed in claim 1; wherein said hydraulic system is for a driving system for a moving platen.

6. A method for detecting an abnormality of a hydraulic system in a molding machine which comprises a hydraulic cylinder for reciprocating a movable member of the molding machine, a valve for controlling a hydraulic fluid which is supplied into the hydraulic cylinder, and a pair of pressure sensors which are provided on the hydraulic cylinder, for detecting the pressures in a pair of pressure chambers of the hydraulic cylinder; comprising the steps of:

comparing the pressures in said pair of pressure chambers on the basis of detecting signals from said pair of pressure sensors when said movable member is inoperative; and outputting an abnormality signal when the pressures in said pair of pressure chambers are substantially out of balance.

7. An apparatus for detecting an abnormality of a hydraulic system in a molding machine comprising:

said hydraulic system which comprises a hydraulic cylinder for reciprocating a movable member of the molding machine, a valve for controlling a hydraulic fluid which is supplied into said hydraulic cylinder, and a pair of pressure sensors provided on said hydraulic cylinder, for detecting the pressures in a pair of pressure chambers of said hydraulic cylinder;

a controlling member for controlling the operation of said valve; and a pressure monitoring member for outputting an abnormality signal when the pressures in the pair of pressure chambers are out of balance or when at least one of the pressures in the pair of pressure chambers is out of a preset range of pressure, by comparing the pressures in the pair of pressure chambers or by judging whether each of the pressures in the pair of pressure chambers is in the preset range of pressure, on the basis of detecting signals from the pair of pressure sensors.

8. An apparatus as claimed in claim 7; wherein said controlling member comprises a servo sequential control unit for previously storing injection conditions including target values of an injection velocity and of an injection pressure; a velocity conversion unit for calculating the current velocity of an injection screw of said molding machine; a velocity operation unit for outputting a velocity correction signal by comparing a velocity feedback signal from said velocity conversion unit with a velocity signal having the stored target value from said servo sequential control unit; and a servo amplifier for amplifying said velocity correction signal and outputting the amplified correction signal to the valve as a driving signal therefor.

9. An apparatus as claimed in claim 7; wherein said controlling member comprises a comparator for comparing said detecting signals from the pair of pressure sensors through differential amplifiers; a servo sequential control unit for previously storing injection conditions including target values of an injection velocity and of an injection pressure; said pressure monitoring member for receiving said detecting signals through said differential amplifiers; a mechanical control unit for controlling the operation of mechanical parts of said molding machine; a pressure operation unit for comparing a pressure feedback signal outputted from said comparator with a pressure signal having the stored target value of said injection pressure from the servo sequential control unit and for outputting a pressure correction signal on the basis of the result thereof; and a servo amplifier for amplifying said pressure correction signal and outputting the amplified correction signal to the valve as a driving signal therefor.

10. An apparatus for detecting an abnormality of a hydraulic system in a molding machine, said hydraulic system comprising a hydraulic cylinder for reciprocating a movable member of the molding machine, a valve for controlling a hydraulic fluid which is supplied into said hydraulic cylinder, and a pair of pressure sensors provided on said hydraulic cylinder, for detecting the pressures in a pair of pressure chambers of said hydraulic cylinder; comprising:

a controlling means for controlling the operation of said valve; and a monitoring means for outputting an abnormality signal when the pressures in the pair of pressure chambers are out of balance or when at least one of the pressures in the pair of pressure chambers is out of a preset range of pressure.

* * * * *